United States Patent [19]

Tsuchiya et al.

[11] 4,205,860
[45] Jun. 3, 1980

[54] STEERING SYSTEM AND STEERING GEAR EMBODIED THE SYSTEM THEREIN

[75] Inventors: Toshio Tsuchiya, Kawagoe; Suwaji Takano, Urawa, both of Japan

[73] Assignee: Honda Giken Kogyo Kabushiki Kaisha, Tokyo, Japan

[21] Appl. No.: 935,999

[22] Filed: Aug. 23, 1978

[30] Foreign Application Priority Data

Aug. 26, 1977 [JP] Japan ............................ 52-102435

[51] Int. Cl.² ............................................. B62D 7/06
[52] U.S. Cl. .................................. 280/95 R; 74/497
[58] Field of Search ............... 280/95 R, 93, 269, 267, 280/268; 74/497; 180/158, 157

[56] References Cited

U.S. PATENT DOCUMENTS

| 1,584,629 | 5/1926 | Marles | 74/497 |
| 2,572,399 | 10/1951 | Sklovsky | 280/95 R |

Primary Examiner—Robert R. Song
Attorney, Agent, or Firm—Irving M. Weiner; Pamela S. Burt; Melvin Yedlin

[57] ABSTRACT

A steering system for light vehicles, wherein the steering ratio is made variable so that the ratio is less than ½ until about 20 degrees of handle steering angle, is ½ to 4/5 between about 20 to 45 degrees of handle steering angle, and is such that the vehicle can turn with the minimum turning radius at a maximum handle steering angle above 45 degrees. The invention also concerns a steering gear with cams for attaining the variable steering ratio. The invention is directed to steering of scooter-like vehicles provided with two steered wheels.

6 Claims, 7 Drawing Figures

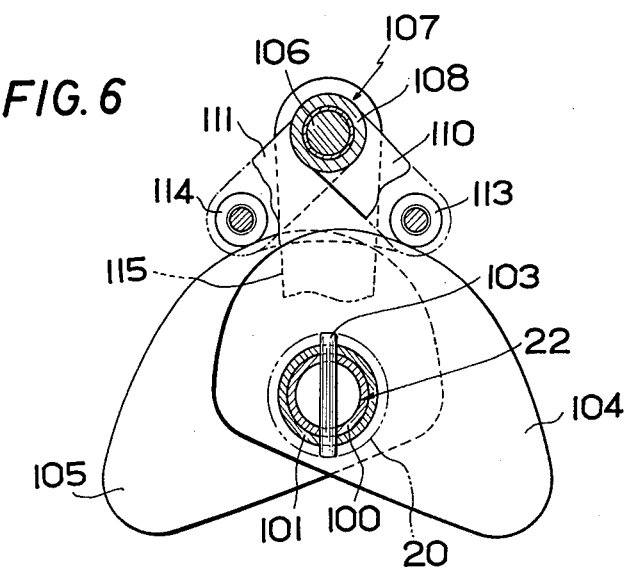
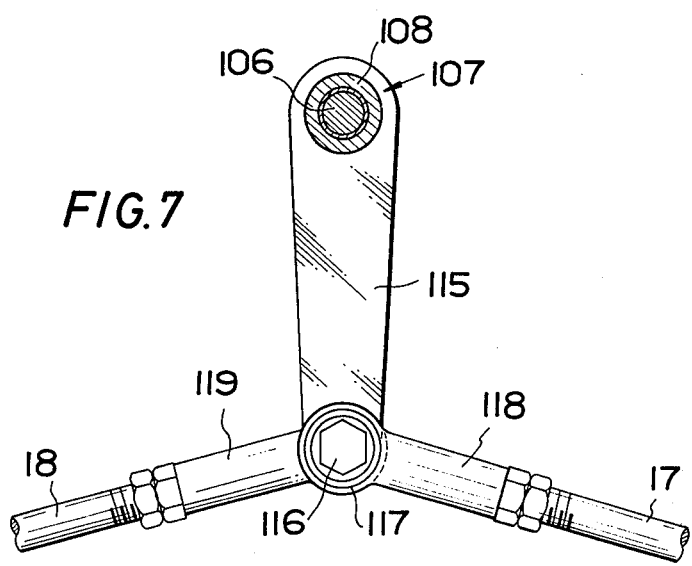

STEERING SYSTEM AND STEERING GEAR EMBODIED THE SYSTEM THEREIN

This invention relates to a steering system and structure which is adapted for use in a light vehicle provided with a bar type steering handle or a similar steering handle and two steered wheels, and more particularly to a steering system and a steering gear wherein a variable steering ratio is attained so as to provide both running stability and improved steering performance of a scooter-like light vehicle.

BACKGROUND OF THE INVENTION

In a vehicle such as a passenger car or a go-cart which has low vehicle height compared with vehicle width, the seat is relatively low so that the driver can sit in a low position to operate and drive the vehicle.

To the contrary, in a scooter-like vehicle provided with two steered wheels, the seat position is so high that the driver must sit on a seat high as an office chair to operate the vehicle. Since there is no extreme difference between the vehicle weight and the driver's weight, when the driver gets on, the center of gravity of the vehicle is positioned at a high point. Therefore, the stability of the vehicle must be controlled by the movement of the body of the driver.

In such vehicle, a bar type steering handle or a similar steering handle is chosen due to considerations of steerability and operatability of the vehicle. Because the center of gravity is high and the vehicle has no side wall to hold the driver's body against the lateral load at the time of turning, the driver must support his body with both arms by gripping the handle grips. Thus keeping feet on the floor, so that a foot operating member such as a treadle may be used, is difficult. Therefore, a steering member such as a steering bar, or a control wheel like that of an aircraft, which is easy to grip with both hands and is capable of being provided thereon with an operating mechanism, is used for easy operation.

However, as opposed to a conventional automobile provided with a steering wheel, the vehicle provided with this type of handle is difficult to operate in a wide operation range and the handle thereof is not capable of being steered by more than 90 degrees by the driver, because, at 90 degrees, the grip on one side of the handle contacts the side of the driver.

With such steering handle, if, on the one hand, the steering ratio is so predetermined as to be constant and low so that the vehicle can turn with a small radius, the movement of the vehicle body with the steering operation becomes so sensitive that the responses of the driver cannot follow it at the time of high speed running and the running stability is lowered. Therefore, such steering system is not desirable due to a lack of safety and running stability.

On the other hand, if the steering ratio is made high, the running stability increases but, if it is made too high, the vehicle body does not turn as expected in spite of proper steering operation when the vehicle turns a corner, such as at an intersection.

In view of the above, if the running stability is considered most important, the steering performance deteriorates so that the small radius turn cannot be made and the turn at a sharp angle becomes difficult. If only the steering performance is satisfied, the running stability is reduced so that the running becomes unstable and the vehicle becomes liable to tumble. Thus, the steering device of a vehicle provided with two steered wheels, having a high center of gravity and steered with a bar type steering or the like handle has been unsatisfactory in one of the above two areas, i.e., running stability or steering performance. Therefore, there is a need for an improvement in the steering system of such special vehicles.

Some of the structures for solving the above problems, wherein a steering bar or the like is connected to such steering gears as in a general vehicle, are complicated in construction; require a large mounting space; are difficult to mount on a simple light vehicle; and are impractical with respect to cost and space. Therefore, there is required a steering gear embodying an improved steering system which is simple in structure, has a high space utility and can be manufactured at low cost.

The present invention effectively solves the above mentioned problems.

SUMMARY OF THE INVENTION

Therefore, an object of the present invention is to provide a steering system adapted for use in a light simple vehicle provided with a bar type steering handle, or a similar steering handle, and two steered wheels, wherein a steering ratio is obtained so that the steered wheels are operated slowly and insensitively in the initial steering angles of the steering handle, but follow the handle steering operation in the intermediate range, and turn with the minimum turning radius above the intermediate angular range. Consequently, the steering ratio is made variable from the initial period to the ending period of the handle steering operation.

Another object of the present invention is to provide a steering system wherein a handle play in high speed range is retained, and the running stability of a scooter-like vehicle is ensured so that the safety of this light simple vehicle is increased, and the vehicle is not liable to tumble. Therefore, the desirable characteristics in the high speed running are obtained, i.e., both the turn at the corner and the small radius turn in a narrow road become easier.

Particularly, in the present invention, the ratio of the steered angle of the steered wheel to the operating angle of the handle is made variable, so that the ratio is less than $\frac{1}{4}$ until approximately 20 degrees of handle steering angle, is $\frac{1}{2}$ to 4/5 between approximately 20 to 45 degrees of the handle steering angle, and is such that the vehicle may turn with the minimum turning radius at a handle steering angle above 45 degrees. When the ratio is less than $\frac{1}{3}$ and more than 1/6 until about 20 degrees of the handle steering angle, and is $\frac{1}{2}$ to 5/7 at a handle steering angle above 45 degrees, the preferable characteristics are attained.

Still another object of the present invention is to provide a structure embodying this system simply and compactly.

In such structure, cams are driven by a steering shaft, and a steered wheel operating member engaged with the cams is driven so that the steered wheels are operated to move according to the cam profiles, and so that the steered wheels are operated at the predetermined ratio to the handle steering angle. Thus, the ratio can be made continuously variable. Further, since a link structure following the cams is adopted, the structure is simple. And, due to the guiding action of the cam, the operation is positive.

The present invention also includes a structure wherein two cam plates are used and symmetrically combined to easily obtain cam profiles which are adapted to attain the variable ratio. That is, the previously mentioned variable ratio can be easily attained without any technical difficulty in manufacturing a compact, light and simple vehicle at low cost.

Preferred embodiments of the present invention will be described in detail in the following with reference to the accompanying drawings so that further objects and advantages of the present invention will become apparent.

BRIEF DESCRIPTION OF THE DRAWINGS

FIG. 6 is a plane view showing the relations between followers and cams.

FIG. 7 is a plane view showing relations between the follower and tie-rod members.

DESCRIPTION OF THE PREFERRED EMBODIMENTS

Figure 2:
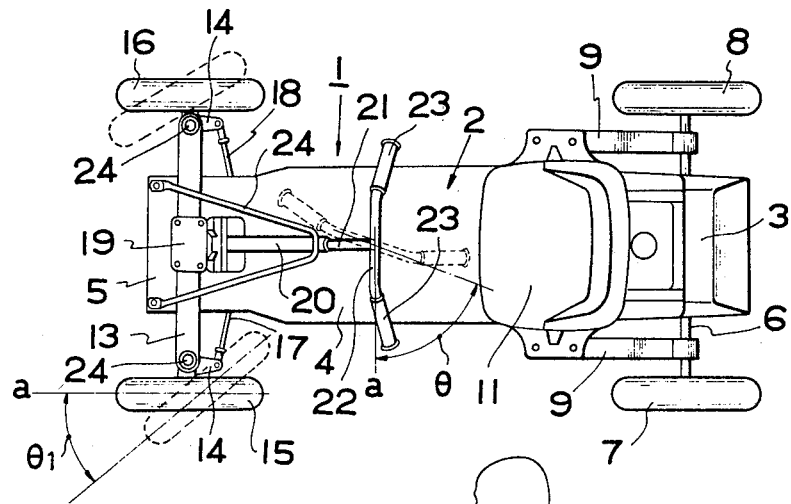
FIG. 2 is a plane view showing an embodiment of the vehicle to which the present invention is applied.
Figure 3:
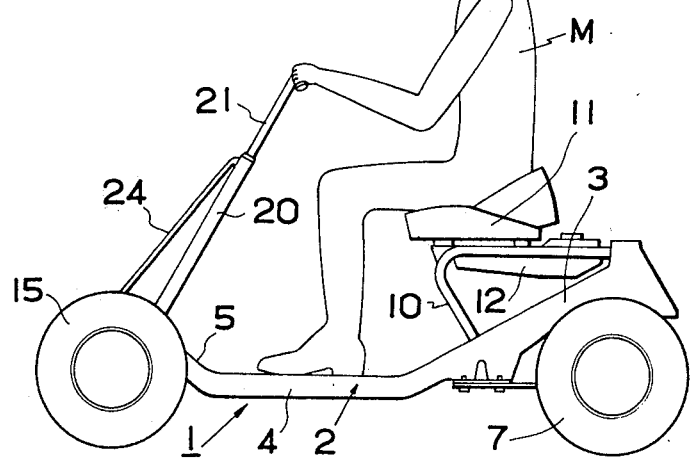
FIG. 3 is a side view of the vehicle shown in FIG. 2.

A vehicle 1 to which the present invention is applied is shown in FIGS. 2 and 3.

Body 2 of the vehicle 1 is inclined diagonally upward in a rear body 3, is flat in an intermediate part and is inclined somewhat forwardly upward in a front 5. An axle 6 is provided transversely below the rear body 3. Rear wheels 7 and 8, which are driving wheels, are provided on both ends of the axle 6. Cushioning plate springs 9 are connected at one end to the side ends of the rear body 3 and at the other end to the axle 6 which is driven by a prime mover (not illustrated) mounted on the rear part 3 of the body.

Elbow-shaped pipe frames 10 are provided on the right and left on the rear body 3, and a seat 11 is fixed on the frames 10 under which a fuel tank 12 is provided.

A cross-member 13 is transversely provided on the front body. Front wheels 15 and 16, which are steered wheels, are mounted to knuckle arms 14 at both ends of the member 13. The knuckle arms 14 are connected with a mechanism for obtaining a variable ratio described hereinbelow through respective tie-rods 17 and 18.

A steering column 20 is provided to rise diagonally rearward on a bracket 19 carrying the cross-member 13. Provided within the steering column 20 is a steering shaft 21 which is connected at the lower end with the mechanism for obtaining the variable ratio described hereinbelow, and projects above the column 20. A steering bar 22, bent rearwardly at both ends and provided on the ends with grips 23 is secured to the upper end of the shaft 21. An accelerating lever and other operating mechanisms are provided on the grips. The steering column 20 is supported by a reinforcing member 24, both lower ends of which are secured to the front end part of the body.

A driver M (FIG. 3) sits on the seat 11, holds the grips 23 of the steering bar 22 with both hands and drives the vehicle with his feet on the middle part 4 of the body.

The steering angle $\theta$ of the steering bar 22 is preferably no more than 90 degrees from the vehicle straight advancing state, as shown in FIG. 2. When it is more than 90 degrees, one of the grips 23 contacts the side of the driver, and the other grip is separated from the hand so that the levers and switches provided in and near the grip become difficult to operate. Therefore, the angle is determined below 90 degrees by considering the operatability of the operating mechanism.

On the other hand, the steering angle $\theta 1$ of the front wheels 15 and 16 is preferably in the range from the vehicle straight advancing state, a, to 50 degrees, which is effective to reduce the turning radius.

According to the present invention, the ratio of the steered angle of the steered wheel to the steering angle of the handle, i.e., the steering ratio, is predetermined as follows:

Up to approximately 20 degrees of the steering angle of the handle, which is generally a high speed running range, the steering ratio is made less than ⅓.

Between about 20 to 45 degrees of the steering angle of the handle, which is generally used at the time of turning a corner such as at an intersection, the ratio is made ½ to 4/5, so that the steered operation of the tire against the operation of the handle does not give a different feel, or cause apprehension as the car begins to turn more quickly, from about 20 degrees.

And, at the maximum steering angle of the handle, above 45 degrees, the ratio is made so that the steered angle of the steered wheel with a minimum turning radius is obtained.

Figure 1:
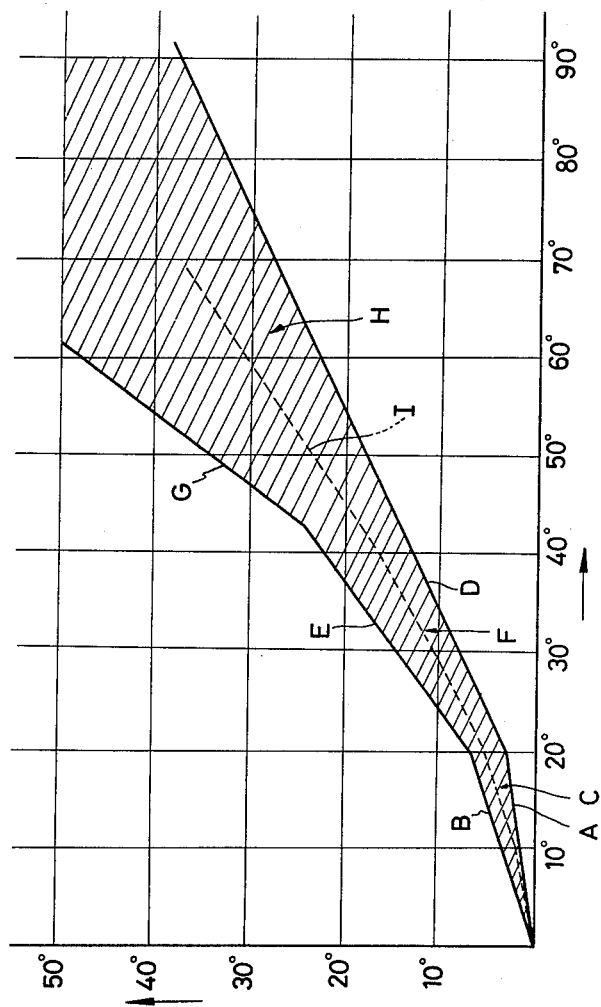
FIG. 1 is a graph for explaining the present invention.

The variation of ratio is made smoothly and continuously, as will be explained with reference to the graph in FIG. 1. In the graph, the abscissa represents the steering angles of the handle and the ordinate represents the steered angles of the steered wheel.

When the steering angle of the handle is in a range of 0–20 degrees, the ratio of the steered angle thereto of the steered wheels, i.e., the tires, is predetermined in a hatched Zone C. i.e., from 1/6 indicated by the line A to ⅓ indicated by the line B. When this ratio is below 1/6, the play of the handle is too large, and apprehension is brought about during the operation. When it is above ⅓, the handle is too sensitive to the steering operation at high speed running, making a driver apprehensive, and it is dangerous.

In the range of 20 to 45 degrees of the steering angle of the handle, the steering ratio is in the range of the hatched Zone F, i.e., from ½ indicated by the line D to 4/5 indicated by the line E. When this ratio is below ½, as the handle is operated, the car will not turn as expected, and the rider is likely to be alarmed. When it is above 4/5, the car begins to turn too quickly from 20 degrees, so that again the driver may be alarmed, and this is also dangerous.

In the range from a steering angle of 45 degrees to the maximum steering angle of the handle, the ratio is in the range of the hatched Zone H, i.e., from ½ indicated by the extension of the line D, to 5/7 indicated by the line G so that the steered angle of the tire at which the car can turn with the minimum turning radius is obtained.

Thus, in the range from 0 degree to the maximum steering angle of the handle, the steered angle of the tire relative to the handle steering angle is determined so as to be variably continuous according to the variation of the ratio. In the graph, the most preferred ratio is indicated by the broken line I.

A structure for obtaining the above mentioned steering ratio will be explained with reference to FIGS. 4 to 7.

Figure 5:
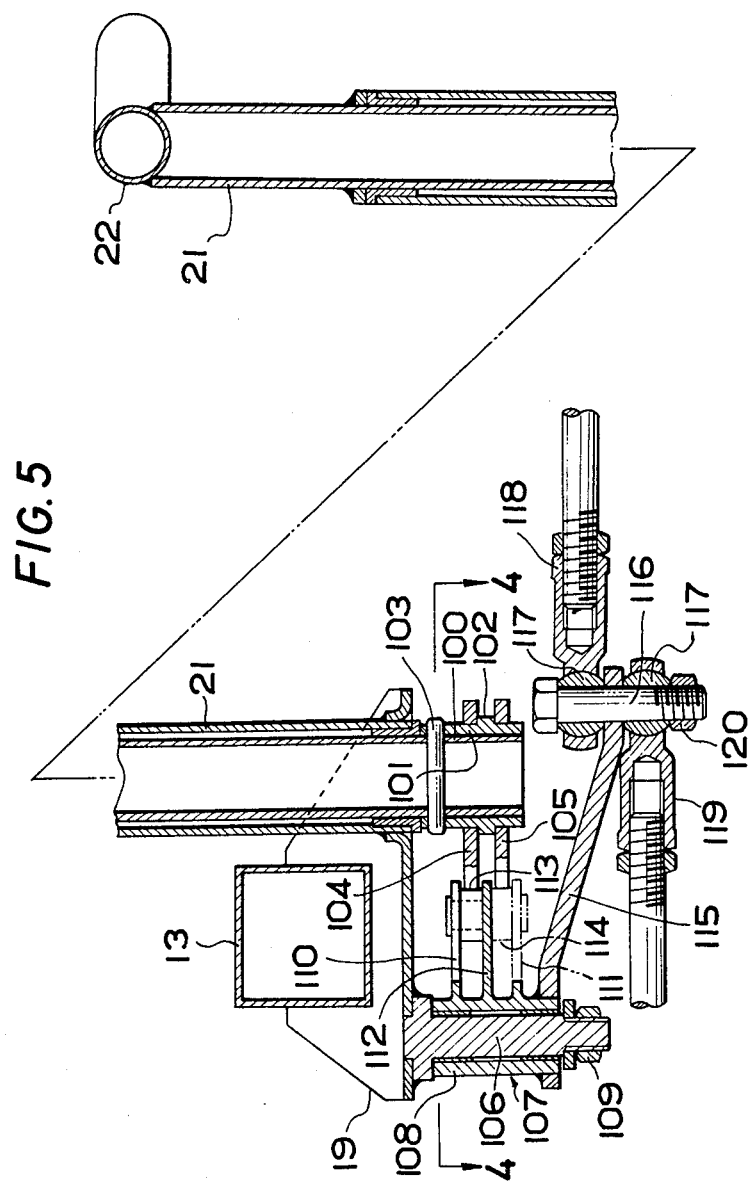
FIG. 5 is a sectioned view on line 5—5 in FIG. 4.

The steering shaft 21 is fitted in the steering column 20 provided on the bracket 19, at the front part 5 of the body, and projects downward through the column at the lower end part 100, as shown in FIG. 5. A sleeve 101, which serves as a plate cam supporting member, is fitted on the outer periphery of the projected part 100, and is locked thereto with a pin 103, so that the shaft 21 is regulated in the upward direction, and so that the sleeve rotates integrally with the shaft 21.

Figure 4:
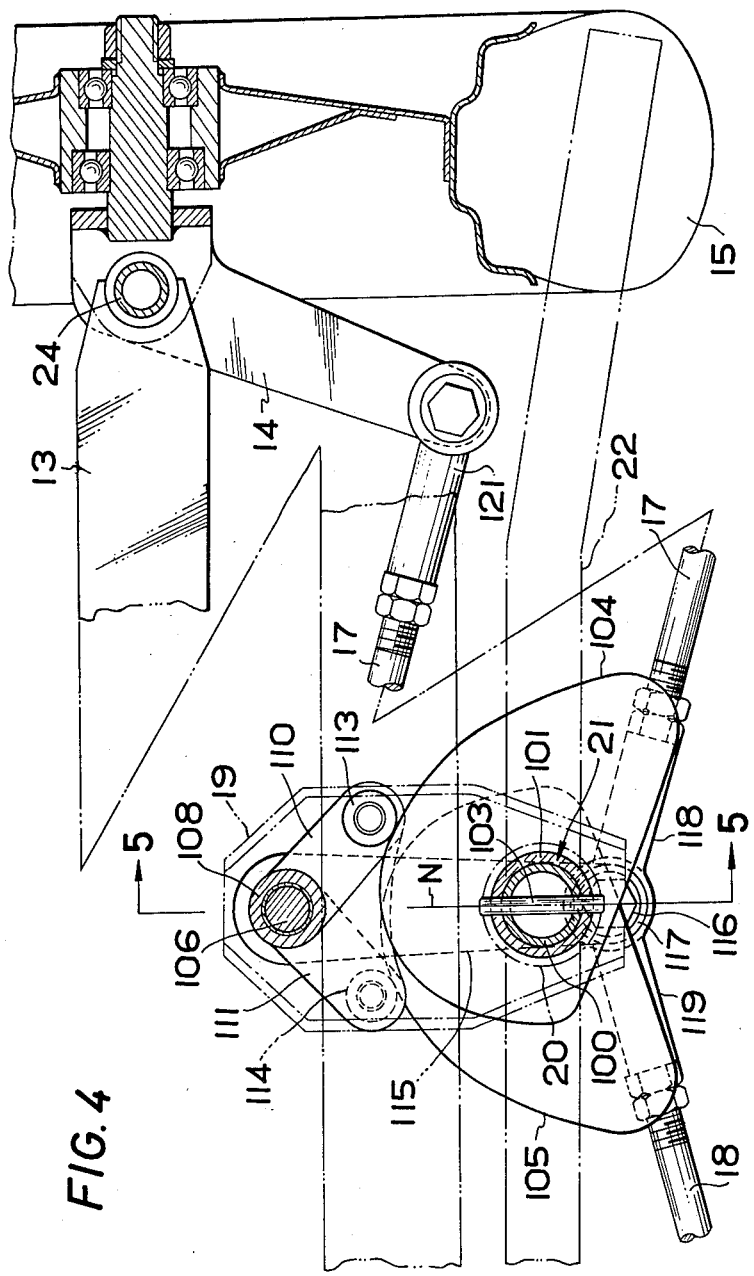
FIG. 4 is an enlarged plane view of the device showing an embodiment of the device according to the present invention.

A flange part 102 is formed in the intermediate part of the sleeve 101. Two cam plates 104 and 105 are fitted and secured by welding or the like to the outer peripheries of the sleeve on both sides of the flange 102, keeping a predetermined space in the vertical direction between them. As shown in FIG. 4, the respective cams have planar symmetrical profiles to each other, and are arranged so as to also be symmetrical with each other about a center line N. That is, the entire profiles formed by parts of profiles of both cams are symmetrical with each other about the center line N in the plan view while being separated vertically. This profile is predetermined on the basis of the previously mentioned steering ratio.

A supporting shaft 106 is provided on the bracket 19 to project downward in a position separate from the projected part 100 of the shaft 21. A sleeve 108 of a driven member 107 is rotatably fitted to the supporting shaft 106 and is supported by a nut 109 at the lower end of the supporting shaft 106. A pair of arms 110 and 111 are provided on the outer periphery of the sleeve 108 so as to extend in the planar symmetrical directions with each other, spaced vertically. The upper arm 110 is positioned to keep a slight clearance above the upper cam 104. The lower arm 111 is provided to keep a slight clearance below the lower cam 105. The arms 110 and 111 are opposed respectively to the cams 104 and 105. A supporting plate 112 is integrally provided on the sleeve 108 in the intermediate part between the arms 110 and 111. The plate 112 is positioned to keep a slight clearance from the cams 104 and 105.

Rollers 113 and 114 are rotatably mounted between the respective free ends of the arms 110, 111 and the width-wise extended parts of plate 112, so as to be spaced laterally to each other, while also being spaced vertically to each other, and to be in contact with the outer peripheral edges of the cams 104 and 105 forming the cam profiles. The relations between the cams 104 and 105 and the rollers 113 and 114 are clearly shown in FIG. 6 by omitting the other parts.

A tie-rod arm 115 is connected at one end thereof to the outer periphery of the lower end of the sleeve 108 and has at the other end a pin 116 passing vertically through the end. The portions of the pin 116 projected above and below the arm 115 are connected respectively to joints 118 and 119 through balls 117 thereby forming universal joints. The balls 117 hold the end of the arm 115 between them and are fixed with a nut 120 screwed on the end of the pin 116. The above described tie-rods 17 and 18 are connected at the base ends thereof respectively to the joints 118 and 119, and are connected at the other ends thereof through the joints 121 respectively to the knuckle arms 14, supporting the right and left front wheels 15 and 16.

The operation is explained as follows. When the steering bar 22 is rotated, the shaft 21 rotates within the column 20 and, concurrently therewith, the sleeve 101, locked with the pin 103 to the lower end 100 of the shaft 21, rotates in the same direction. The cams 104 and 105, integral with the sleeve 101, rotate so that the rollers 113 and 114, in contact respectively with the outer peripheral edges of the cams 104 and 105, move following the cam profiles. Since the rollers 113 and 114 are in contact with the symmetrical cam profiles of the cam plates 104 and 105 at relative symmetrical positions, each of the rollers follows the motion of the other roller. Because the rollers 113 and 114 are mounted respectively on the arms 110 and 111, which are integral with the sleeve 108, the sleeve 108 is pivotally moved, with the supporting shaft 106 as a fulcrum. With the pivotal movement of the sleeve 108, the tie-rod arm 115, secured at one end to the sleeve 108, moves about the supporting shaft 106. With the movement of the tie-rod arm 115, one of the tie-rods 17 and 18, connected through the universal joints to the end of the arm 115 is pulled, and the other is pushed, to make the respective knuckle arms 14 move about the supporting shafts 24, with both ends of the cross-member 13 as fulcra. The wheel 15 turns about the supporting shaft 24, and the other wheel 16 turns in the same direction to steer the two steered wheels.

Accordingly, by the operation of the steering bar 22, the cam plates 104 and 105, connected to the shaft 21, are driven, and the tie-rod arm 115 is driven through the rollers 113 and 114, in contact with the cam plates, to steer the vehicle.

In the above embodiment, the sleeve 101 supporting the cams 104 and 105 is locked to the shaft 21 with the pin 103 so that the cams are replaceable to make the steering ratio freely variable in the previously mentioned ratio range. However, the sleeve 101 may be fixed to the downward projected part 100 of the shaft by means such as welding instead of the pin 103. Two cams 104 and 105 are arranged above and below, but the cams may be formed of one plate. Further, in the illustration, the cams are fitted directly to the lower end of the steering shaft 21. However, the cams may be provided on a separate supporting shaft which is driven by the steering shaft through gears or the like.

When the described mechanism is used, the previously mentioned variable ratio will be easily obtained. Since the tie-rod is driven by the cams, the steering system can be formed by a simple structure with few parts, in a minimum space and thus is adapted for a simple, small, light vehicle.

We claim:

1. A steering gear for providing a variable steering ratio in a steering system for a vehicle having a bar-type steering handle or a similarly-operated steering handle and a relatively substantially highly-positioned seat, comprising:

two steered wheels connected to knuckle arms and tie-rods so as to be operative to steer said vehicle;
  a steering shaft driven by said steering handle;
  at least one cam operatively connected to, and driven by, said steering shaft;
  a connecting member connected to a driven member;
  said connecting member being connected at one end thereof to said tie-rods and being pivotally supported at the other end thereof on said driven member;
  a follower means provided on said driven member so as to drive said driven member by following said at least one cam;

said at least one cam comprising two symmetrical plate cams arranged coaxially with a space in the vertical direction therebetween;
a pair of arms provided on said driven member in plane-symmetrical relation and vertically spaced from each other; and
rollers provided on said arms and being in contact with said plate cams.

2. A steering gear according to claim 1, wherein:
said two plate cams are connected to the lower end of said steering shaft.

3. A steering gear according to claim 1, wherein:
the respective rollers of said arms contact in plane-symmetrical positions with cam profiles defined by said two plate cams; and
a tie-rod arm provided coaxially with said pair of arms is connected at one end thereof in common with the right and left tie-rods through universal joints.

4. A steering gear according to claim 1, wherein:
the profiles of said cams are formed such that said variable steering ratio of said steering system provides a steering ratio of less than substantially $\frac{1}{3}$ up to a handle steering angle of substantially 20°, a steering ratio of substantially $\frac{1}{2}$ to 4/5 between a handle steering angle of substantially 20° to 45°, and a steering ratio which permits said vehicle to turn with a minimum turning radius at a maximum handle steering angle above substantially 45°.

5. A steering gear according to claim 4, wherein:
said steering ratio of less than substantially $\frac{1}{3}$ up to a handle steering angle of substantially 20° is substantially in the range of 1/6 to $\frac{1}{3}$.

6. A steering gear according to claim 4, wherein:
said steering ratio provided at said maximum handle steering angle above substantially 45° is substantially in the range of $\frac{1}{2}$ to 5/7.

* * * * *